United States Patent [19]

Yamamoto

[11] Patent Number: 4,659,417

[45] Date of Patent: Apr. 21, 1987

[54] APPARATUS FOR SUPPLYING FLEXIBLE WORKPIECE

[75] Inventor: Hideto Yamamoto, Hiratsuka, Japan

[73] Assignee: Yokohama Rubber Co., Ltd., Tokyo, Japan

[21] Appl. No.: 680,464

[22] Filed: Dec. 11, 1984

[30] Foreign Application Priority Data

Dec. 28, 1983 [JP] Japan .................................. 58-245374

[51] Int. Cl.$^4$ ........................ B29D 30/00; B29D 30/30
[52] U.S. Cl. .................................. 156/405.1; 156/133; 156/414; 156/421.6; 156/447; 242/67.2
[58] Field of Search ..................... 156/405.1, 126, 127, 156/123, 133, 394.1, 414–420, 421.6, 128.1, 128.6, 129, 130, 130.3, 443, 447, 450, 469, 538, 351, 358; 211/20, 23, 79; 248/274; 242/67.2

[56] References Cited

U.S. PATENT DOCUMENTS 4,105,486 8/1978 Cantarutti ...................... 156/126 X Primary Examiner—Donald Czaja
Assistant Examiner—Thomas Bokan
Attorney, Agent, or Firm—Finnegan, Henderson, Farabow, Garrett & Dunner

[57] ABSTRACT

An apparatus for supplying a flexible workpiece is provided with a workpiece-conveying unit formed around a drum body is installed so that it can move in the axial direction of the drum body. An introduction section and a supply section for the workpiece are formed within the workpiece-conveying unit, and a drive mechanism and a centering mechanism are provided between the workpiece introduction section and the supply section.

10 Claims, 11 Drawing Figures

APPARATUS FOR SUPPLYING FLEXIBLE WORKPIECE

BACKGROUND OF THE INVENTION

1. Technical Field of the Invention

The present invention relates to an apparatus for supplying a flexible workpiece, and more particularly to an improvement to an apparatus for supplying a workpiece which is capable of supplying a belt-shaped flexible workpiece such as a tire tread automatically and positively to the next process, within a reduced space.

2. Description of the Prior Art

An apparatus for supplying a material for a tire tread used during the formation of green tires, such as that shown in FIG. 1, is well known. In this apparatus, the direction in which a workpiece-conveying unit 1 moves is the same as the direction in which a workpiece W (tread material) is supplied to a tire-forming drum and, because it is necessary to ensure sufficient working space for an operator, and for other reasons, the stroke of the movement of the workpiece-conveying unit 1 toward the tire-forming drum 2 from an approach position (a position at which the workpiece W is supplied onto a green tire on the tire-forming drum 2, while being centered) to a standby position (a position at which the workpiece W is mounted onto the workpiece-conveying unit 1) is long.

As a result, when the workpiece-conveying unit 1 approaches the tire-forming drum 2, the front of the workpiece-conveying unit 1, i.e., the section in the vicinity of the portion on which a centering mechanism 3 is installed, overhangs some distance beyond a frame 4. Consequently, the workpiece-conveying unit 1 is instable and rocks while it is being moved, and gaps are generated with respect to conveyer unit slide guides 5, which not only adversely affects the accuracy with which the workpiece W is attached to a belt material B but also makes it difficult to maintain the accuracy of the slide guides 5. The size of the entire apparatus is large, so that a large installation space capable of including the full operating range is necessary.

In addition, since, in a conventional apparatus, the workpiece-conveying unit 1 is installed horizontally at a fixed height, when mounting a workpiece W of a fixed length (tread material) placed on a carriage onto the workpiece-conveying unit 1, the central portion of the workpiece W, when lifted up, droops downward since the workpiece W is elastic. For this reason, when mounting the workpiece W onto the workpiece-conveying unit 1, it is necessary to lift up both ends to a considerable height, thus forcing the operator to do a laborious action, and reducing work efficiency.

SUMMARY OF THE INVENTION

This invention has been devised to overcome these drawbacks encountered with a conventional supply apparatus, and an object of the invention is to provide an apparatus for supplying a workpiece which enables an efficient and easy mounting of a workpiece being supplied onto a unit for conveying the workpiece, while providing centering; an improvement in the operating efficiency of supplying the workpiece by reducing the stroke of the apparatus' movement to the next process; and which also enables a reduction in the size of the overall apparatus so that it can be operated efficiently within a small space.

To this end, the invention provides an apparatus for supplying a flexible workpiece, wherein a workpiece-conveying unit formed around a drum body is installed so that it can move in the axial direction of the drum body, the workpiece-conveying unit forming a leading section and a supply section for the workpiece, and a drive mechanism and a centering mechanism are provided between the workpiece leading section and the supply section.

This object of the invention will become apparent from the following description of the embodiment of the present invention, taken in conjunction with the accompanying drawings.

DESCRIPTION OF THE PREFERRED EMBODIMENT

An embodiment of the present invention will be described hereinunder with reference to the accompanying drawings.

Figure 1:
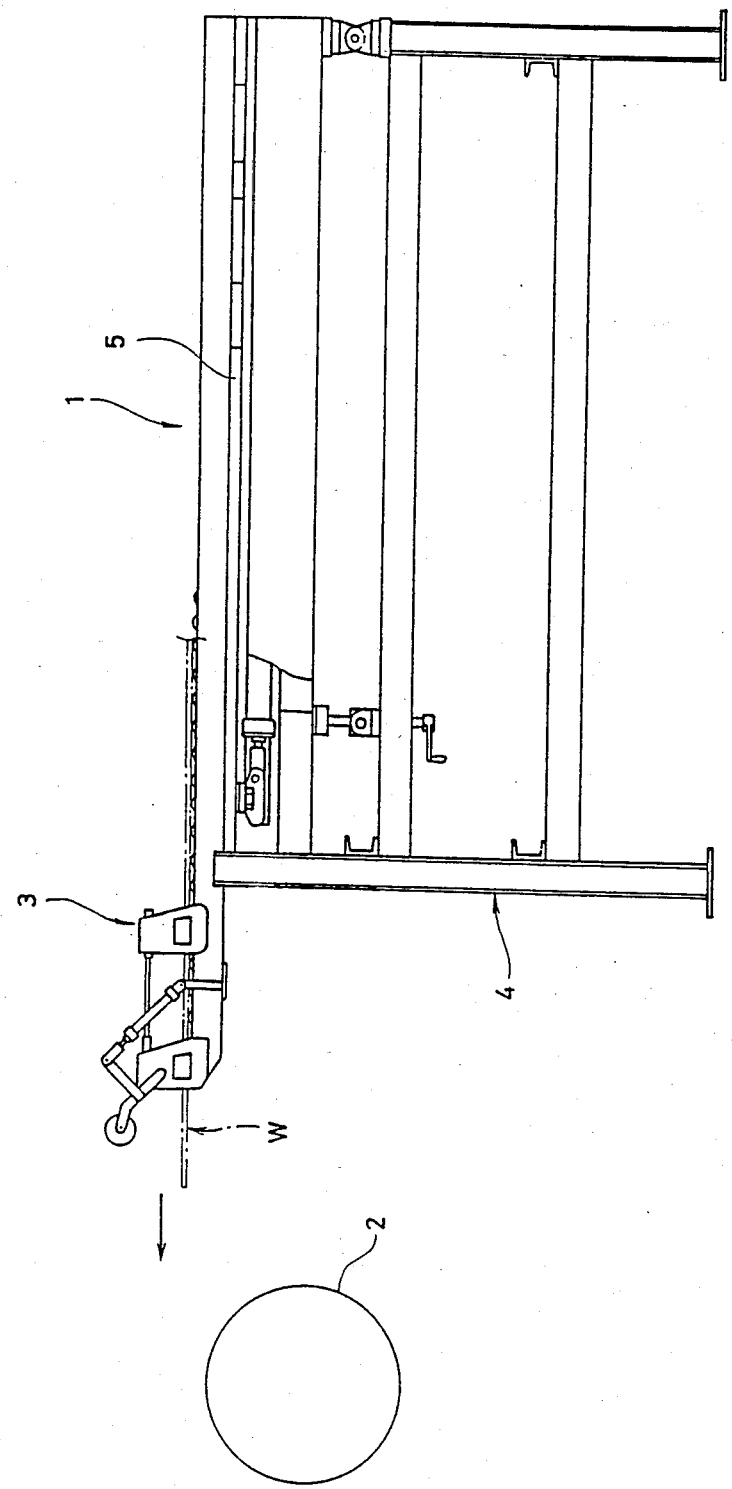
FIG. 1 is a schematic front elevation of a conventional apparatus for supplying workpieces.
Figure 2:
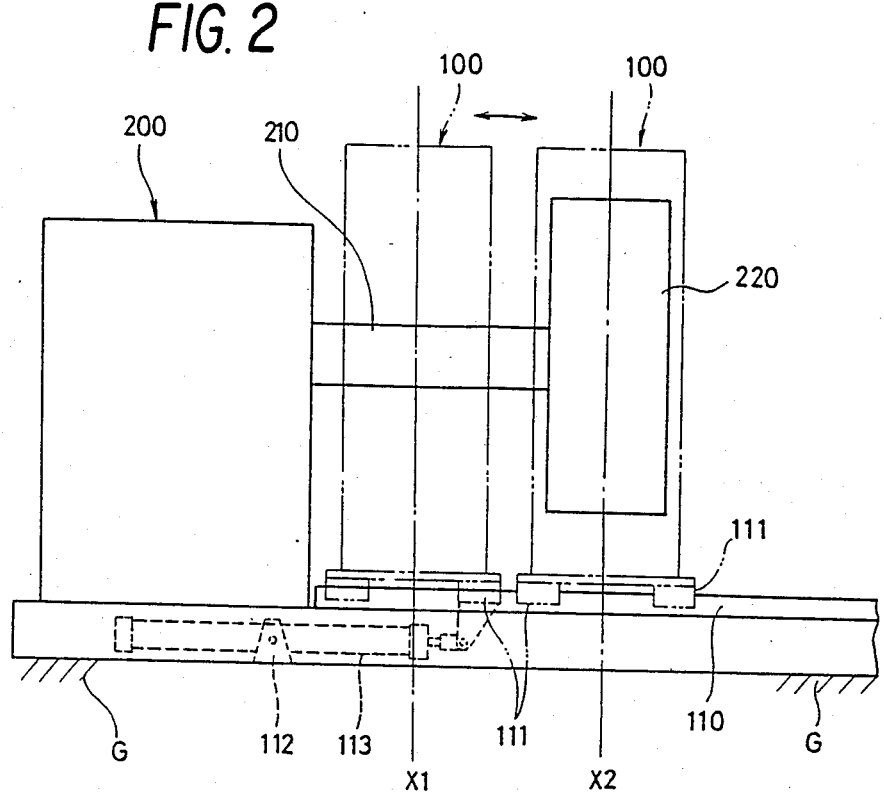
FIG. 2 is a diagram of the layout of a workpiece-conveying unit according to the present invention.

Referring first to FIG. 2, which shows the layout of a supply apparatus according to the present invention, reference numeral 100 denotes a unit for conveying workpieces, and reference numeral 200 denotes the body of a tire-forming machine forming the workpieces (tread material). A drum 220 (drum body 220) for assembling a belt and a tread, or a tire-forming drum 220, is rotatably supported on one side of the tire-forming machine body 200 by a main shaft 210. The arrangement of the workpiece-conveying unit 100 is such that it is slidably mounted by sliding bearings 111 on guide rails 110 laid toward the drum body 220, and is slid therealong by an air cylinder installed on a floor surface G by brackets 112.

X1 denotes a standby position of the workpiece-conveying unit 100, and X2 a position at which it supplies a workpiece W to the drum body 220.

Figure 3A:
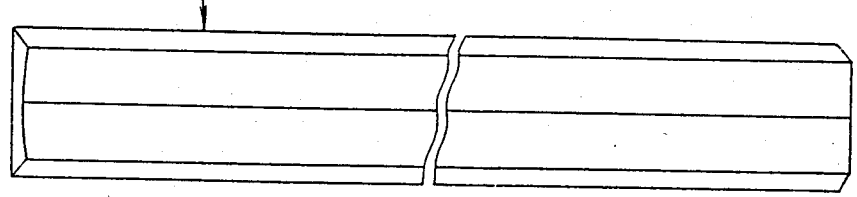
FIGS. 3(a) and 3(b) are a top plan view and a side elevation of a workpiece respectively.
Figure 3B:
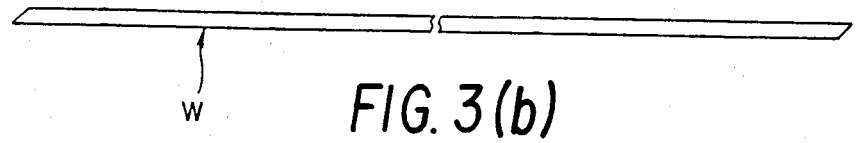

FIGS. 3(a) and 3(b) are a top plan view and a side elevation of the workpiece W (tread material).

Figure 4:
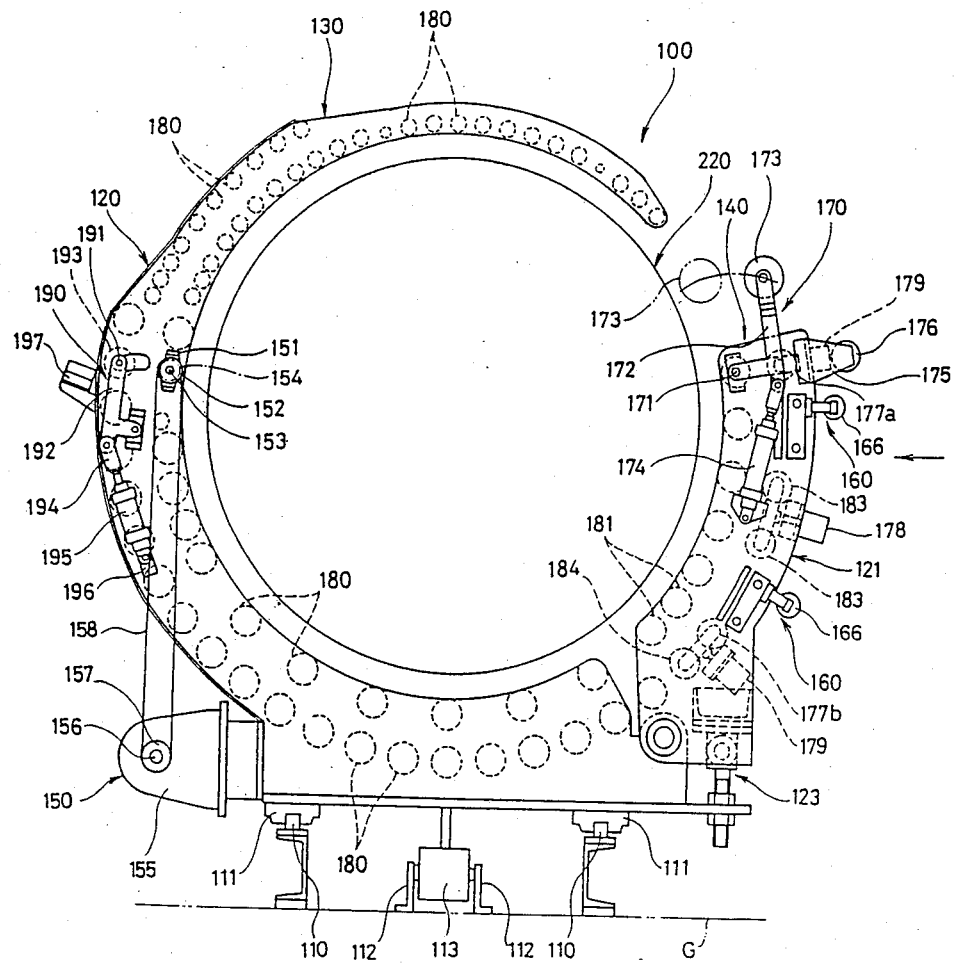
FIG. 4 is a front elevation of the workpiece-conveying unit.
Figure 5:
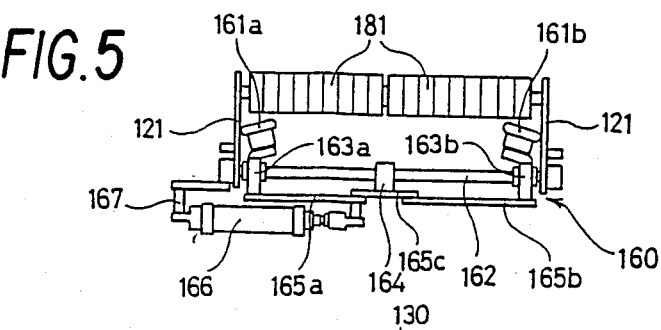
FIG. 5 is a top plan view of a supply section.
Figure 6:
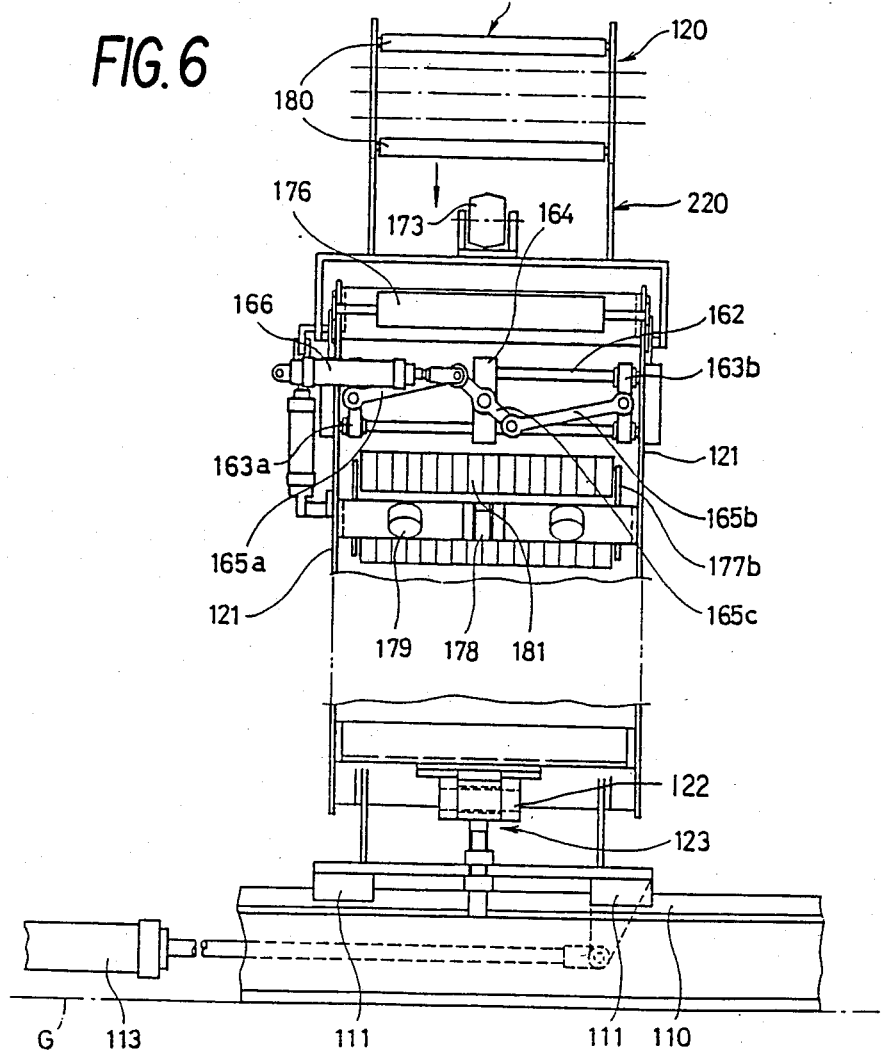
FIG. 6 is a side elevation of FIG. 4.

As shown in FIGS. 4 to 6, a conveyer frame 120 and a centering frame 121, which are formed in a cylindrical shape in such a manner that they surround the drum body 220 on the guide rails 110, are mounted on the workpiece-conveying unit 100.

A leading section 130 for the workpiece W is provided at one side of the conveyer frame 120, and a supply section 140 for transferring the workpiece W to the drum body 220 is formed at the other end of the centering frame 121.

The centering frame 121 is free to swing about an adjusting mechanism 123 with a hinge 122 provided on the conveyer frame 120 acting as a center, and the leading position of the centering frame 121 with respect to the drum body 220 can be set thereby.

A driving mechanism 150, a centering mechanism 160, and a transfer mechanism 170 are consecutively provided between the introduction section 130 and the supply section 140 of the conveyer frame 120.

A plurality of free rollers 180 are rotatably provided in the upper and lower surfaces of the conveyer frame 120, at predetermined intervals in the longitudinal direction thereof.

Two-way universal rolls 181 are rotatably arranged around the centering frame 121.

The driving mechanism 150 provided on the leading section 130 side is provided with a drive roll 152 on the inner wall surface of the conveyer frame 120 facing the drum body 220 side, on a bearing member 151. A sprocket wheel 154 is fitted onto a support shaft 153 of the drive roll 152, and a drive motor 155 mounted on the side of the conveyer frame 120 is also provided with a sprocket wheel 157. A chain 158 is wound around the sprocket wheels 154 and 157.

A pressure-contact means 190 for the workpiece W is provided on the drive roll 152.

The arrangement of this pressure-contact means 190 is such that a pinch roll 193 in pressure contact with the drive roll 152 is provided at end tip of an arm 192 provided rotatably about a pin 191, and an air cylinder 195 is connected to the rear end thereof by a joint 194.

The telescopic motion of the air cylinder 195 brings the pinch roll 193 into pressure-contact with the drive roll 152 to pincer the workpiece W, and a rotational driving force applied to the drive roll 152 from the drive motor 155 pulls the workpiece W into the workpiece-conveying unit 100.

Reference numeral 196 denotes a metal fitting for mounting the air cylinder 195, and reference numeral 197 denotes a photoelectric switch for detecting the tip of the workpiece W.

Next, as shown in FIGS. 5 and 6, centering mechanisms 160 are provided at predetermined intervals around the centering frame 121, leading toward the supply section 140. Each of the centering mechanisms 160 is provided with centering rollers 161a and 161b, each facing one of the ends of one of the universal rolls 181.

As shown in FIG. 5, the centering rollers 161a and 161b are installed on a guide shaft 162 mounted on the centering frame 121 by sliding bearing members 163a and 163b, in such a manner that they are free to move forward and backward.

The sliding bearing members 163a and 163b are also rotatably connected to a center block 164 through which the central portion of the guide shaft 162 is inserted, by links 165a, 165b, and 165c.

An air cylinder 166 mounted on a side wall portion of the centering frame 121 is connected to the link 165a. The telescopic motion of the air cylinder 166 moves the centering rollers 161a and 161b forward and backward in the widthwise direction of the drum body 220 through the links 165a, 165b, and 165c and the sliding bearing members 163a and 163b, and centers the workpiece W.

Reference numeral 167 is a metal fitting for mounting the air cylinder.

In the delivery mechanism 170 provided on the workpiece W supply section 140, an arm 172 is rotatably attached to the end of the centering frame 121 by a pin 171 and, at the end of this arm 172, a pressure-contact roll 173 for pressing the end of the workpiece is rotatably provided on a belt member B wound around the drum body 220.

The end of an air cylinder 174 mounted on a side portion of the centering frame 121 is attached to the rear end of the arm 172. The telescopic motion of the air cylinder 174 rotates the pressure-contact roll 173 toward the drum body 220, through the arm 172.

Reference number 175 denotes a stay plate provided on the external periphery surface of the end of the centering frame 121, reference numeral 176 denotes a free roller, reference numerals 177a and 177b denote brackets, reference numeral 178 denotes a photoelectric switch, and reference numerals 183 and 184 denote universal rolls.

The operation of the embodiment of the present invention with this construction will now be described with reference with FIGS. 8(a) to 8(c).

First, in an operation of preparing the workpiece W which is material for a tread supplied to the workpiece-conveying unit 100, the workpiece-conveying unit 100 is placed in the standby position X1. As shown in FIG. 8(a), the operator holds one end of the workpiece W which has been cut to a predetermined length, and inserts it through the leading section 130 of the workpiece-conveying unit as far as the position of the photoelectric switch 197.

When the photoelectric switch 197 detects the tip of the workpiece W, the air cylinder 195 electrically connected thereto starts its telescopic motion, so that the pinch roll 193 pincers the workpiece W to bring it into pressure-contact with the peripheral surface of the drive roll 152.

When the drive roll is rotatably driven by the drive motor 155 in this state, the workpiece W is drawn into the workpiece-conveying unit 100. As the tip of the workpiece W passes the photoelectric switch 178, the rotation of the drive motor 155 is stopped after the lapse of a fixed time, completing the operation of drawing in the workpiece W. FIG. 8(c) illustrates this state, showing the completion of the preparatory stage.

The workpiece-conveying unit 100 is then moved to the supply position X2 by the air cylinder 113 so that the operation of attaching the workpiece W can be started.

Figure 7:
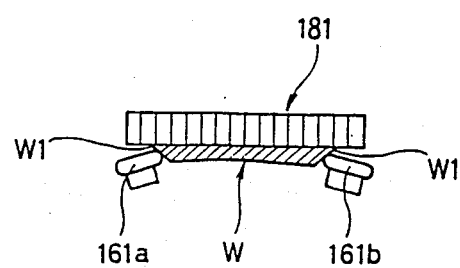
FIG. 7 is a diagram illustrating the operation of centering rollers.
Figure 8C:
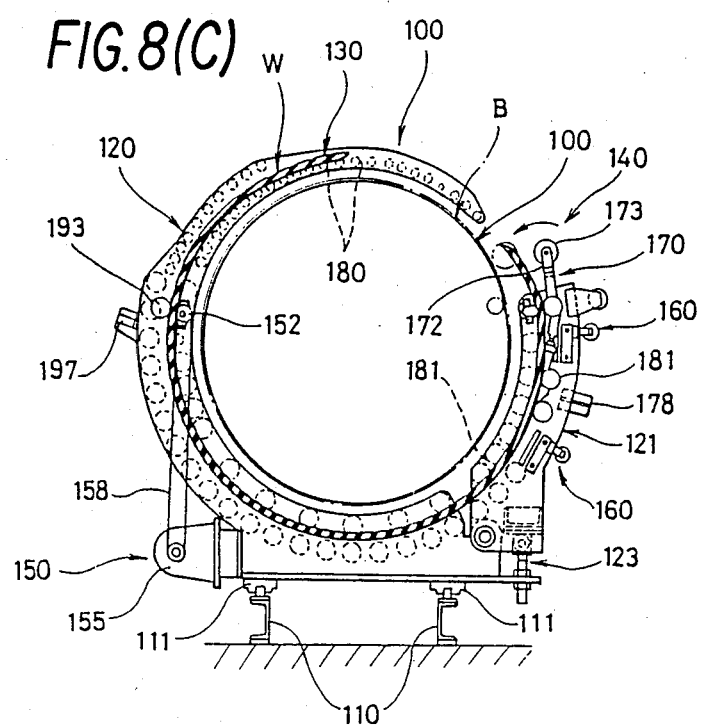
FIGS. 8(a) to 8(c) are diagrams illustrating the operation of supplying a workpiece.
Figure 8A:
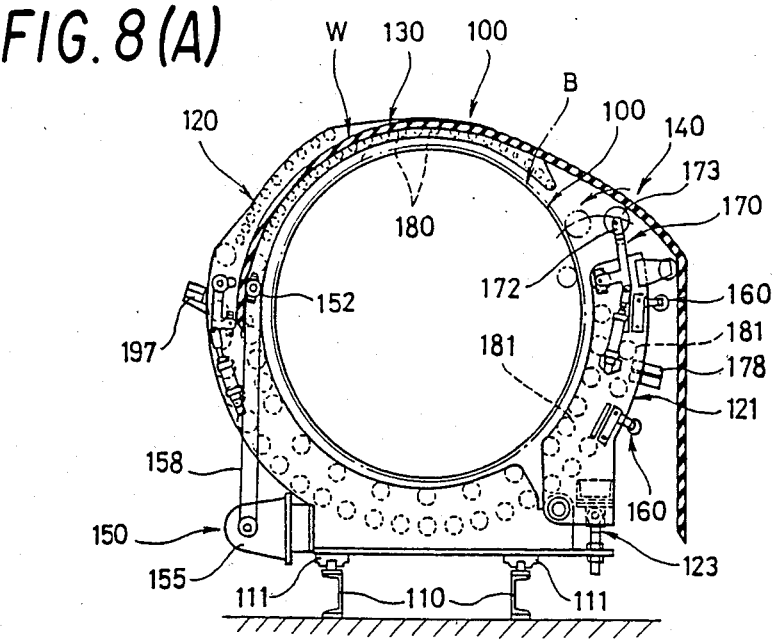
Figure 8B:
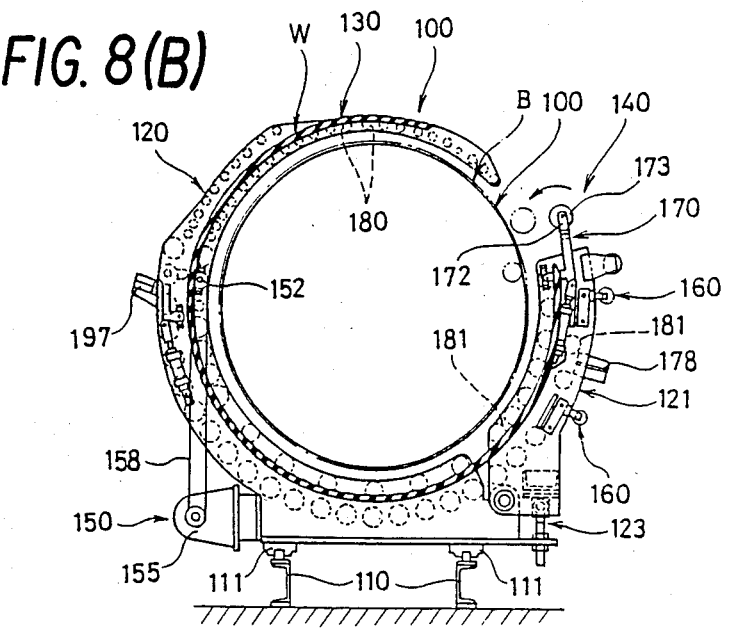

First, as shown in FIG. 8(c), the brackets 177a and 177b are pressed toward the drum body 220 by the air cylinder 179, so that the end of the workpiece W is pincered by the free roller 176 and the two-way universal rollers 183, 184 provided on the brackets 177a, 177b, and the workpiece W is brought into pressure-contact with the universal rolls 181 installed on the conveyer frame 120. The centering rollers 161a and 161b are brought into pressure-contact with shoulder portions W1 of the workpiece W by the motion of the air cylinder 166, as shown in FIG. 7.

The rotation of the drive roll 152 supplies the end of the workpiece W to the pressure-contact roll 173, and the pressure-contact roll 173 is rotated and brought into pressure-contact toward of the drum body 220 by the motion of the air cylinder 174, so as to press the end of the workpiece W onto the belt material B attached to the peripheral surface of the drum body 220.

This state is shown in FIG. 8(c).

The pinch roll 193 is now released, and the drum body 220 is rotatably driven so the workpiece W is supplied onto the belt material B attached to the drum body 220, while being centered by the centering rollers 161a and 161b.

When the drum body 220 has completed one rotation, the workpiece-conveying unit 100 is returned to its standby position X1 by the motion of the air cylinder 113.

With this step, the operation of attaching the workpiece W is completed. When the workpiece-conveying unit 100 is returned to its standby position X1, the free roller 176 and the universal rollers 183 and 184 forming a pincering section are released, and the centering rollers 161a and 161b are also released, ready for the preparation of the next workpiece W.

Because of this arrangement, it is possible to supply workpieces W within a reduced space and with a very good operational efficiency.

In this invention, a workpiece-conveying unit formed around a drum body is installed so that it can move in the axial direction of the drum body, the workpiece-conveying unit forming a leading section and a supply section for the workpiece, and a drive mechanism and a centering mechanism is provided between the leading section and the supply section for the workpiece. Therefore, the present invention has advantages in that the workpiece can be easily mounted onto the workpiece-conveying unit effectively and, while providing centering, the operational efficiency in supplying workpieces can be increased by reducing the stroke through which the unit is moved to the next process, and the supply apparatus can be employed effectively within a reduced space by making the apparatus compact.

The embodiments of the invention in which an exclusive property or privilege is claimed are defined as follows:

1. An apparatus for receiving, transporting and joining a first belt-shaped flexible workpiece, such as a tire component, to a second, belt-shaped flexible workpiece, in constructing a tire, said apparatus comprising an annular chamber having an opening adapted to receive said first belt-shaped flexible workpiece, means for moving said first workpiece upon introduction to said annular chamber and circumferentially through said annular chamber to shape said first workpiece to an annular configuration, means for moving said annular chamber with said first workpiece therein relative to a drum having an exterior cylindrical surface onto which said second belt-shaped flexible workpiece is mounted, means for bringing an end portion of said first workpiece into contact with said second workpiece and means for imparting relative rotational movement to said workpieces to concentrically mount said workpieces one upon the other.

2. The apparatus of claim 1 having means for centering said workpieces relative to each other prior to concentrically mounting said first workpieces.

3. The apparatus of claim 1 having a plurality of rollers within said annular chamber and adapted to facilitate movement of said workpiece through said chamber.

4. The apparatus of claim 3 wherein said rollers are arranged in generally opposed bands and define a path for movement of said first workpiece therebetween.

5. The apparatus of claim 1 wherein said means for moving said first workpiece includes means for gripping said first workpiece, said gripping means being within said annular chamber.

6. The apparatus of claim 5 wherein said gripping means includes a pair of opposed rolls between which said first workpiece is gripped, with one of said rolls being driven to impart said movement to said workpiece.

7. The apparatus of claim 1 wherein said means for bringing an end portion of said first workpiece into contact with said second workpiece includes a roll adapted to engage said end portion to bring it into contact with said second workpiece and maintain said contact during rotation of said drum during said mounting of said workpieces.

8. An apparatus for receiving, transporting and joining a first belt-shaped flexible workpiece, such as a tire component to a second, belt-shaped flexible workpiece, said apparatus comprising an annular chamber having an opening adapted to receive said first belt-shaped flexible workpiece and having a plurality of rollers arranged in generally opposed bands defining a path for movement of said first workpiece therebetween, means for moving said first workpiece upon introduction to said annular chamber and circumferentially through said annular chamber to shape said first workpiece to an annular configuration means for moving said annular chamber with said first workpiece therein relative to a drum having an exterior cylindrical surface onto which said second belt-shaped flexible workpiece is mounted, means for centering said workpieces relative to each other, means for bringing an end portion of said first workpiece into contact with said second workpiece and means for imparting relative rotational movement to said workpieces to concentricaly mount said workpieces one upon the other.

9. The apparatus of claim 8 wherein said means for moving said first workpiece includes means for gripping said first workpiece, said gripping means being within said annular chamber.

10. The apparatus of claim 9 wherein said gripping means includes a pair of opposed rolls between which said first workpiece is gripped, with one of said rolls being driven to impart said movement to said first workpiece.

* * * * *